June 26, 1956
J. H. DANZER
2,751,827
MINIATURE CAMERAS WITH AUTOMATIC WINDING MECHANISM
Filed April 3, 1952
2 Sheets-Sheet 1
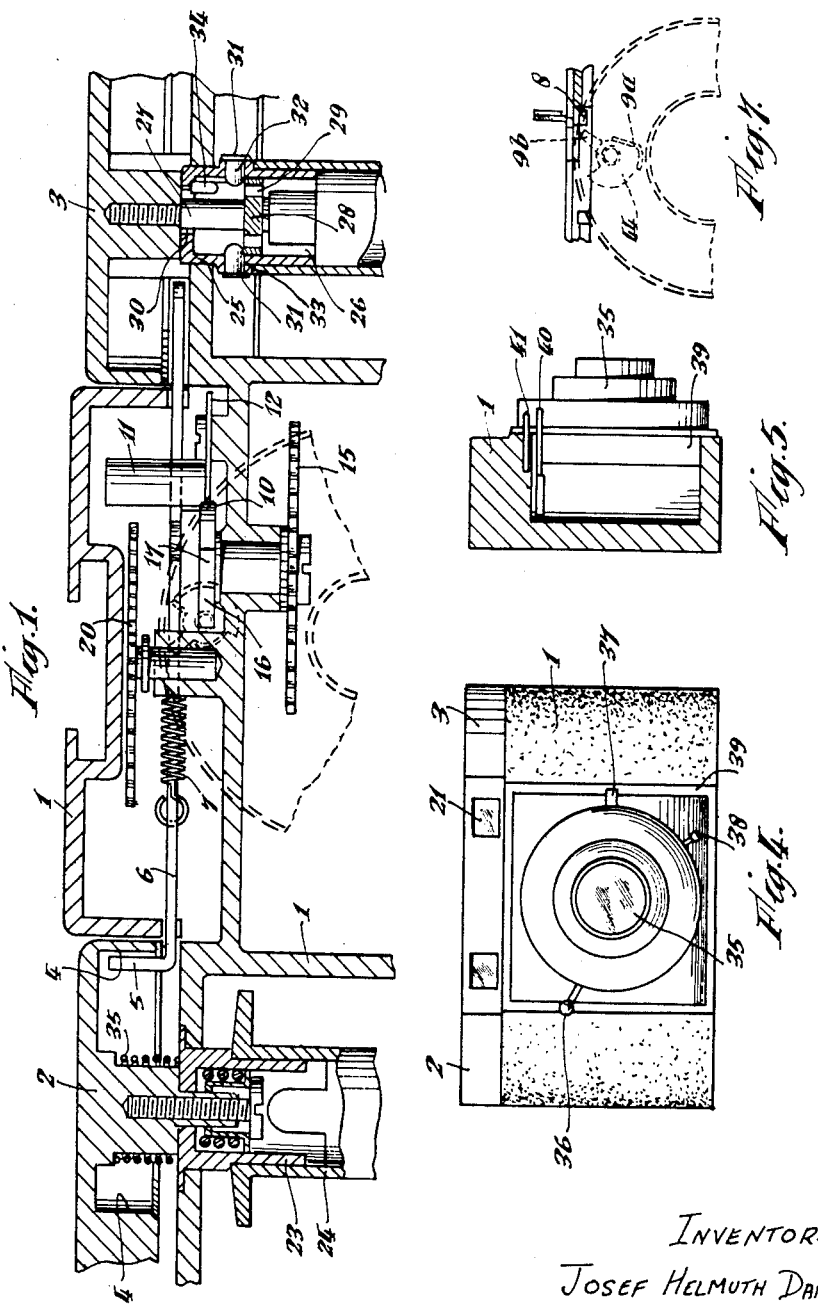
INVENTOR:-
JOSEF HELMUTH DANZER
By:- Chatwin & Company
ATTYS.

June 26, 1956  J. H. DANZER  2,751,827
MINIATURE CAMERAS WITH AUTOMATIC WINDING MECHANISM
Filed April 3, 1952  2 Sheets-Sheet 2
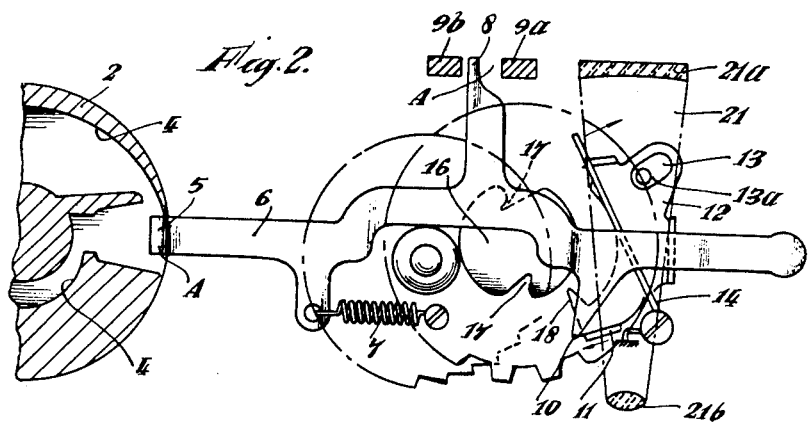
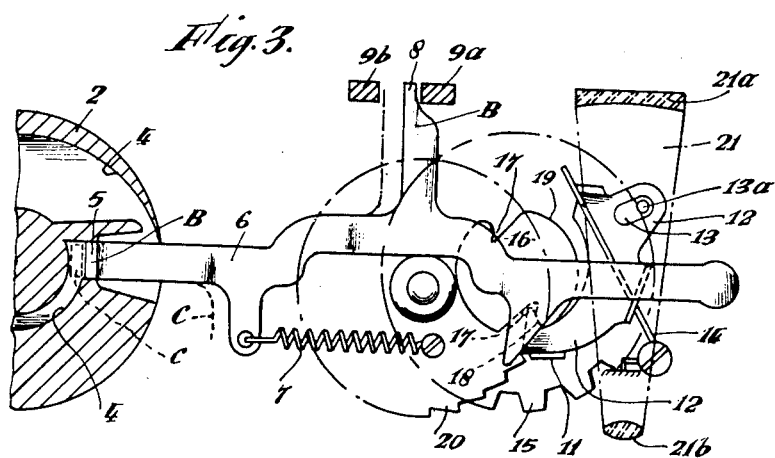
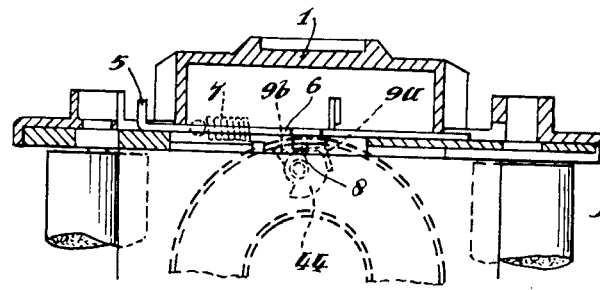
INVENTOR:-
JOSEF HELMUTH DANZER

United States Patent Office 2,751,827
Patented June 26, 1956

2,751,827

MINIATURE CAMERAS WITH AUTOMATIC WINDING MECHANISM

Josef Helmuth Danzer, Nurnberg, Germany

Application April 3, 1952, Serial No. 280,215

Claims priority, application Germany April 16, 1951

8 Claims. (Cl. 95—31)

This invention relates to roll film cameras, its main object being to provide improved means whereby winding-on of the roll film automatically causes locking of the film in position after the required amount has been wound on, whilst at the same time causing cocking of the shutter, the winding-on means being then locked until independent release of the shutter.

A second object is to provide means whereby a visual warning is given in the view finder of the camera whenever the operative mechanism of the camera has not been loaded preparatory to exposure of the film.

A third object is to provide improved means for automatically counting the number of exposures.

An embodiment of roll-film camera is hereinafter particularly described with reference to the accompanying drawings, wherein:

Figure 1 is a longitudinal section through the camera; Fig. 2 is a plan view of the operative parts in unloaded state; Fig. 3 is a plan view of the operative parts in loaded state; Fig. 4 is a front elevation of the camera; Fig. 5 is a central vertical section through the camera; Fig. 6 is a partial longitudinal section to illustrate a shutter cocking member; Fig. 7 is a partial longitudinal section of the same members to illustrate a second position thereof.

In these figures, 1 is a frame for the camera, 2 is a knob for winding on the film, and 3 is a knob for winding back the film. At the underside of the winding-on knob 2 is provided a spiral track 4 which receives a finger 5 on one end of an operating slide 6 permanently tensioned to the right of Figure 1 by a tension spring 7 secured between it and the frame 1. The slide 6 has a finger 8 which is disposed between two lugs 9a and 9b secured to the shutter cocking mechanism. Both the lugs can be moved to left and right but their separation is constant. The slide 6 has a tooth 10 which coacts with an upstanding lug 11 mounted on a pivoted plate 12 having a slotted hole 13 by which the plate 12 is engaged on a pin 13a. The plate 12 is permanently urged clockwise in Fig. 1 by a spring 14. 15 is a sprocket for engagement in the usual edge perforations of the film and is secured to a cam disk 16 having two indented portions 17 adapted to receive a locking hook 18 formed on the plate 12. 19 is a peripheral portion of the cam disk 16 about which the hook 18 can slide during one part of the operation. 20 is a counting wheel having peripheral ratchet teeth adapted to be engaged by the lug 11. A view finder 21 for the camera has front and rear lenses 21a and 21b and is so arranged that in the unloaded position of the operative parts, shown in Fig. 1, the lug 11 comes within and obstructs the field of view, whilst in the loaded position shown in Fig. 2, it is moved clear of the view finder.

The winding-on knob 2 is provided with a spring-loaded friction coupling 22 which couples it to claws 23 serving to receive the usual film spool 24. The reason for provision of the friction coupling will be apparent from the description of operation given hereinafter.

Adjacent the winding-back knob 3 is provided a sleeve 25 with a claw member 26 for reception of the usual spool. This sleeve 25 is normally free to rotate independently of the winding-back knob but the latter is carried on a shaft 27 having at its lower end a circular plate 28 with perforations 29. The shaft 27 is passed through a bore 30 in the sleeve 25. Externally of the sleeve 25 is a circular spring clip 31 carrying two internal lugs 32 which engage through apertures 33 and which serve to retain the plate 28 normally in its lower position as shown in Fig. 1. When it is desired to couple the winding-back knob 3 to the sleeve 25 the knob 3 is pulled upwardly until one or other of the perforations 29 is engaged by a pin 34 secured on the sleeve 25, permitting driving of the sleeve 25 to wind back the film. 35 is a lens for the camera, 36 is a shutter release member, 37 is an aperture control, and 38 is a self-release control.

The operation is as follows:

In the position shown in Fig. 2, the mechanism is unloaded, i. e. the film has yet to be wound on for the next exposure and the shutter is not yet cocked. The winding-on knob 2 is therefore rotated clockwise and the winding-on spool 24 is rotated accordingly through the frictional drive 22. At the same time the finger 5 is moved across by its engagement with the track 4 and the slide 6 moves to the left, against the tension of the spring 7. During this winding-on motion, the film engaged with the sprocket 15 causes the latter to rotate together with the cam disk 16. It will be seen that in the unloaded position of Fig. 2, the tooth 10 of the slide 6 prevents the plate 12 from moving into a position wherein its hook 18 can engage into one or other of the indentations 17 of the cam disk 16. As the slide 6 is moved, however, the tooth 10 allows the lug 11 and thus the plate 12 to move clockwise until the hook 18 engages into an indentation 17. This then prevents further rotation of the sprocket 15 and the film cannot be wound further.

During this movement to the left of the slide 6, the finger 8 engages the lug 9b and moves it to the left to cock the shutter mechanism. It will be appreciated that once the lugs 9a and 9b have been moved into cocked position they cannot return until release of the shutter manually or otherwise, the shutter being of the type in which the cocking mechanism including the spaced lugs is held in cocked position until the shutter is released. The cocking means remains in set position until the shutter is actuated by the release member. Accordingly, once the slide 6 has moved to the left, it is prevented from returning by the finger 8 engaged between the lugs 9a and 9b in cocked position. At the end of one complete rotation of the winding-on knob 2, the finger 5 escapes from the track 4 and moves from position C to position B wherein it prevents further rotation of the winding-on knob 2. As the rotation of the winding-on spool must stop before the completion of rotation of the winding-on knob 2, because only a limited movement of the film is necessary, the friction coupling 22 permits the necessary further partial rotation of the knob 2 after the film sprocket 15 becomes locked.

During the clockwise movement of the plate 12 towards the locking position, its lug 11 engages with a tooth of the counting wheel and moves it round by one tooth to total up another exposure on the reel of film. It can be seen also that, in the unloaded position of Fig. 2, the lug 11 comes within the light path of the view finder 21 so that a warning is given that the camera mechanism is not loaded. As the plate 12 moves clockwise towards locking position, the lug 11 is moved out of the light path of the view finder, so indicating to the user that the mechanism is loaded.

Upon release of the shutter by operation of the member 36 or 38, the lugs 9a and 9b can move back towards the right in Fig. 1. Accordingly, the slide 6 is freed to move back into the position of Fig. 1. This again allows rotation of the knob 2 and at the same time the tooth 10 forces the lug 11 and plate 12 in an anti-clockwise direction so as to disengage the hook 13 from the indentation 17 and free the cam disk 16 for rotation. At the same time, the lug 11 moves back into the light path of the view finder to warn the user that the mechanism is unloaded.

In Figs. 4 and 5, 39 denotes a front plate, for the camera housing, upon which the shutter mechanism, lens mount, and iris diaphragm are mounted and which can be removed therewith as a unit. 40 denotes a rod for connecting the range finder of the camera with the focussing means for automatic focus adjustment. 41 denotes a rod for coupling the shutter cocking mechanism to the shutter.

As can be seen from Figs. 6 and 7, a pivotal movement of the shutter cocking member 44, for the purpose of cocking the shutter, is produced by the longitudinal movement of the slide 6 which is pushed, against the action of the spring 7, by action on the finger 5 when the winding-on knob 2 is rotated. The finger 8 formed on the slide 6 engages against the lug 9b of the shutter cocking member 44. Further rotation of the winding-on knob 2 results in escape of the finger 5 from the spiral channel of the winding-on knob 2. As a result of the loading of the spring 7, engaged between the slide 6 and the housing 1, the slide 6 performs a return movement until the finger 8 engages against the lug 9a (Fig. 6) of the shutter cocking member 44.

I claim:

1. In a roll film camera, a frame, a rotatable mounting therein for a winding-on spool, a frictional drive coupled to the rotatable mounting, a winding-on knob coupled to the frictional drive, said knob having a radially-spiralled track recess, a slide movable in the frame radially with respect to the winding-on knob, a finger on the slide engaged in the track recess of the winding-on knob, spring-loaded means connected between the slide and the frame to urge the slide away from the winding-on knob into unloaded position, the slide being movable from un-loaded position to loaded position by one complete rotation of the winding-on knob in the direction to wind on the film, and the track recess being formed to release the slide after the slide has been moved fully radially inwards with respect to the winding-on knob, a sprocket rotatably mounted in the frame and disposed so as to be engaged by the usual longitudinal series of sprocket holes of the film, a cam disk integral with said sprocket, locking means mounted pivotally on the frame and urged into engagement with said cam disk by spring-loading means, a tooth on the slide disposed so as to engage with the locking means whereby when the slide is in un-loaded position the tooth holds the locking means out of engagement with the cam disk and when the slide is in loaded position the tooth allows the locking means to move to lock the cam disk, cocking means on the frame for the usual shutter, and a finger on the slide disposed so as to couple to the cocking means for the shutter.

2. In a roll film camera, as claimed in claim 1, a view finder mounted on the frame, and an upstanding lug on the locking means positioned for movement into and out of the light path of the view finder as the locking means are moved respectively out of and into locking position.

3. In a roll film camera, as claimed in claim 1, an upstanding lug on the locking means, and a numbered wheel rotatably mounted in the frame and having ratchet teeth on its periphery, the wheel being positioned with respect to the lug on the locking means for engagement of a tooth by the lug and partial rotation of the numbered wheel when the locking means move into locking position.

4. In a roll film camera, as claimed in claim 1, an upstanding lug on the locking means, a view finder mounted on the frame and so positioned with respect to the locking means that the lug is moved into and out of the light path of the view finder as the locking means are moved out of and into locking position, a numbered wheel rotatably mounted in the frame, and ratchet teeth on the periphery of the wheel, said wheel being positioned with respect to the lug for engagement of a tooth by the lug when the locking means move into locking position.

5. In a roll film camera, a frame, a rotatable mounting therein for a winding-on spool, a frictional drive coupled to the rotatable mounting, a winding-on knob coupled to the frictional drive, said knob having a radially-spiralled track recess, a slide movable in the frame radially with respect to the winding-on knob, a finger on the slide engaged in the track recess of the winding-on knob, spring-loading means connected between the slide and the frame to urge the slide away from the winding-on knob into unloaded position, the slide being movable from un-loaded position to loaded position by one complete rotation of the winding-on knob in the direction to wind on the film, and the track recess being formed to release the slide after the slide has been moved fully radially inwards with respect to the winding-on knob, a sprocket rotatably mounted in the frame and disposed so as to be engaged by the usual longitudinal series of sprocket holes of the film, a cam disk integral with said sprocket, locking means mounted pivotally on the frame and urged into engagement with said cam disk by spring-loading means, a tooth on the slide disposed so as to engage with the locking means whereby when the slide is in un-loaded position the tooth holds the locking means out of engagement with the cam disk and when the slide is in loaded position the tooth allows the locking means to move to lock the cam disk, a finger on the slide disposed so as to couple to cocking means for the shutter, a winding-back spool for the film rotatably mounted in the frame, an operating knob for said winding-back spool rotatably carried on the frame, and releasable coupling means between said knob and spool to permit winding back of the film.

6. In a roll film camera, a frame, a rotatable mounting therein for a winding-on spool, a frictional drive coupled to the rotatable mounting, a winding-on knob coupled to the frictional drive, said knob having a radially-spiralled track recess, and a radial locking recess between the inner and outer ends of the radially-spiralled track recess, a slide movable in the frame radially with respect to the winding-on knob, spring-loading means connected between the slide and the frame to urge the slide away from the winding-on knob into unloaded position, the slide being movable from un-loaded position to loaded position by one complete rotation of the winding-on knob in the direction to wind on the film, a sprocket rotatably mounted in the frame and disposed so as to be engaged by the usual longitudinal series of sprocket holes of the film, a cam disk integral with said sprocket, locking means mounted pivotally on the frame and urged into engagement with said cam disk by spring-loading means, a tooth on the slide disposed so as to engage with the locking means whereby when the slide is in un-loaded position the tooth holds the locking means out of engagement with the cam disk and when the slide is in loaded position the tooth allows the locking means to move to lock the cam disk, shutter cocking mechanism including spaced lugs movable on the frame parallel to the movement of the slide, said lugs being arranged to be movable towards the winding-on knob to cock the shutter mechanism, and a finger on the slide engaged between said lugs the spacing of which is such as to allow the slide, after its full movement towards the winding-on knob, to perform a short return movement by which the finger in the track recess can move into the radical recess and lock the winding-on knob against further rotation until the slide is released by release of the shutter, said shutter being of the type in which the cocking mechanism including the spaced lugs is held in cocked position until the shutter is released.

7. In a roll film camera, a frame, a rotatable mounting therein for a winding-on spool, a frictional drive coupled to the rotatable mounting, a winding-on knob coupled to the frictional drive, said knob having a radially-spiralled track recess, a slide movable in the frame radially with respect to the winding-on knob, a finger on the slide engaged in the track recess of the winding-on knob, spring-loading means connected between the slide and the frame to urge the slide away from the winding-on knob into unloaded position, the slide being movable from un-loaded position to loaded position by one complete rotation of the winding-on knob in the direction to wind on the film, and the track recess being formed to release the slide after the slide has been moved fully radially inwards with respect to the winding-on knob, a sprocket rotatably mounted in the frame and disposed so as to be engaged by the usual longitudinal series of sprocket holes of the film, a cam disk integral with said sprocket, locking means mounted pivotally on the frame and urged into engagement with said cam disk by spring loading means, the relationship between the teeth of the sprocket and the cam disk being such as to permit a half rotation of the sprocket each time the film is wound-on in accordance with the picture width, a tooth on the slide disposed so as to engage with the locking means whereby when the slide is in un-loaded position the tooth holds the locking means out of engagement with the cam disk and when the slide is in loaded position the tooth allows the locking means to move to lock the cam disk, cocking means on the frame for the usual shutter arranged to be movable in one direction parallel to the movement of the slide to cock the shutter, and a finger on the slide disposed so as to engage the cocking means for the shutter.

8. In a roll film camera, as claimed in claim 1, an upstanding lug on the locking means, a view finder mounted on the frame and so positioned with respect to the locking means that the lug is moved into and out of the light path of the view finder as the locking means are moved out of and into locking position, a numbered wheel rotatably mounted in the frame, and ratchet teeth on the periphery of the wheel, said wheel being positioned for engagement of its teeth by the lug to move the numbered wheel by a portion of a turn each time the locking means are moved into locking position, release of the shutter serving to allow the slide to move back into unloaded position under the influence of its spring-loading, said shutter being of the type in which the cocking mechanism including the spaced lugs is held in cocked position until the shutter is released.

References Cited in the file of this patent
UNITED STATES PATENTS

| | | |
|---|---|---|
| 1,200,174 | Dense | Oct. 3, 1916 |
| 1,967,061 | Muros | July 17, 1934 |
| 2,148,636 | Muller | Feb. 28, 1939 |
| 2,180,064 | Nuchterlein | Nov. 14, 1939 |
| 2,257,424 | Meyer | Sept. 30, 1941 |
| 2,304,887 | Crumrine | Dec. 15, 1942 |
| 2,335,439 | Nerwin | Nov. 30, 1943 |
| 2,511,215 | Mihalyi | June 13, 1950 |
| 2,571,661 | Bing | Oct. 16, 1951 |

FOREIGN PATENTS

| | | |
|---|---|---|
| 648,771 | Great Britain | Oct. 28, 1948 |